United States Patent Office 3,232,839
Patented Feb. 1, 1966

3,232,839
Δ$^{1,4}$-16α-METHYL STEROIDS
Klaus Kieslich, Ulrich Kerb, and Gerhard Raspe, Berlin-Charlottenburg, Germany, assignors to Schering AG, Berlin, Germany
No Drawing. Filed Nov. 12, 1963, Ser. No. 323,062
Claims priority, application Germany, Feb. 22, 1961, Sch 29,274; July 27, 1963, Sch 33,627
24 Claims. (Cl. 167—77)

This application is a continuation-in-part of our copending application Serial No. 172,124, filed February 9, 1962, for "Δ$^{1,4}$-16α-Methyl Steroids," now abandoned.

The present invention relates to new Δ$^{1,4}$-16α-methyl steroids and to anti-inflammatory compositions utilizing such steroids as anti-inflammatory agent.

It is a primary object of the present invention to provide new Δ$^{1,4}$-16α-methyl steroids of the above type.

It is a further object of the present invention to provide new Δ$^{1,4}$-16α-methyl steroids which are useful as intermediates in the production of compounds of the steroid series, such compounds for example as 16α-methyl-Δ$^{1,4,6}$-pregnatriene-11β-21-diol-3,20-dione-21-acetate; 6,16α-dimethyl -6-bromo-Δ$^{1,4}$-pregnadiene-11β,21-diol-3,20-dione-21 - acetate; 6,16α - dimethyl-Δ$^{1,4,6}$-pregnatriene-11β,21-diol - 3,20-dione-21-acetate; 6α-halogen-16α-methyl-Δ$^{1,4}$-pregnadiene-11β,21-diol-3,20-dione-21-pyranyl ether; 6α-methyl - 16α - methyl-Δ$^{1,4}$-pregnadiene-11β,21-diol-3,20-dione - 21 - pyranyl ether; 6α-halogen-16α,21-dimethyl-Δ$^{1,4}$-pregnadiene-11β,21-diol-3,20-dione; and 6α,16α,21-trimethyl - Δ$^{1,4}$-pregnadiene-11β,21-diol-3,20-dione, and also to methods of producing such Δ$^{1,4}$-16α-methyl steroids. The compounds of the present invention can be used as intermediates by hydrogenating one or more of the double bonds, for example.

In addition, and this is a further object of the present invention, the compounds of the present invention have useful therapeutic properties by themselves, particularly as anti-inflammation agents. In fact, the compounds of the present invention are not only generally useful as anti-inflammation agents, but these compounds, and particularly certain specific compounds among the new compounds produced according to the present invention, as will be more fully set forth below, have highly superior properties as anti-inflammation agents.

Other objects and advantages of the present invention will be apparent from a further reading of the specification and of the appended claims.

With the above and other objects in view, the present invention mainly comprises as the new compounds useful as intermediates and as anti-inflammatory agents, compounds of the formula:

(I)
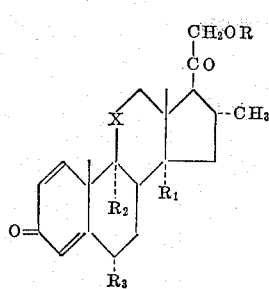

wherein R is selected from the group consisting of hydrogen and acyl wherein acyl is preferably derived from a lower aliphatic carboxylic acid, wherein $R_1$ is selected from the group consisting of hydrogen and hydroxyl, $R_1$ being hydroxyl only when X is —$CH_2$—, wherein X is selected from the group consisting of —CO—, —CHOH— and —$CH_2$—, wherein $R_2$ is selected from the group consisting of hydrogen and halogen, and wherein $R_3$ is selected from the group consisting of halogen and methyl when $R_1$ is other than hydroxyl, and when $R_1$ is hydroxyl then $R_3$ is selected from the group consisting of hydrogen, methyl and halogen.

The substituents $R_2$ and $R_3$ may be any of the halogens, i.e. iodine, bromine, chlorine or fluorine, and when $R_2$ and $R_3$ are both halogen, they may be the same halogen or different halogens. It is most preferred that $R_2$ and $R_3$ be either chlorine or fluorine, the most preferred compounds being those wherein $R_2$ and/or $R_3$ are fluorine.

The compounds of the present invention may be produced according to different reaction mechanisms. According to one method, a compound of the formula:

(II)
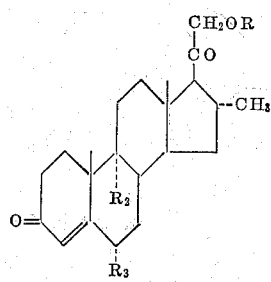

wherein R, $R_2$ and $R_3$ have the same definitions as above, is subjected to the biochemical introduction of an oxygen function on the 11-carbon atom or the 14-carbon atom, i.e. to hydroxylation of the 11-carbon atom or the 14-carbon atom by biochemical methods. The 11-position introduced hydroxyl group can, if desired, be converted in known manner by oxidation to the oxo group. The resulting compound is then converted into the corresponding Δ$^{1,4}$-steroid by treatment with dehydrogenating microorganisms or by known chemical dehydrogenation agents, and, in the event that the 21-position is an hydroxyl group, the same can then, if desired, by selective acylation of the 21-position hydroxyl group be converted into the corresponding acylated compound.

The biochemical hydroxylation of the starting material can be carried out, for example, with Curvularia lunata, Mutant NRRL 2380.

The hydroxyl group introduced at the 11-position carbon atom can either be an α-oriented of β-oriented hydroxyl group. The hydroxyl group in the 11-position either α-oriented of β-oriented, can be further oxidized by means of oxidation agents normally used for this purpose, for example N-bromacetamide.

As 1,2-position dehydrogenating microorganism it is possible to use, for example, Bacillus lentus, Mutant MB 284, or Corynebacterium simplex, Mutant ATCC 6946.

For acylation of the 21-hydroxyl group, the most preferred acid is acetic acid, and other preferred acids are other lower aliphatic carboxylic acids such as propionic acid, butyric acid, etc., or their reactable acid derivatives may be used in the reaction.

It is clear that the above method requires, in the case where both $R_2$ and $R_3$ are halogens, such as fluorine, and wherein X carries an oxygen function, for example in the production of compounds of the following formula:

(III)

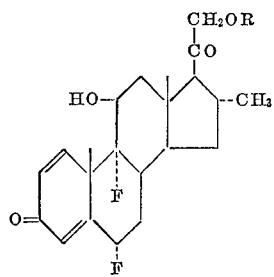

the use as starting material of a Δ⁴-compound without the oxygen function in 11-position, but with the halogen atoms in 6-position and in 9-position, for example a starting compound of the following formula:

(IV)

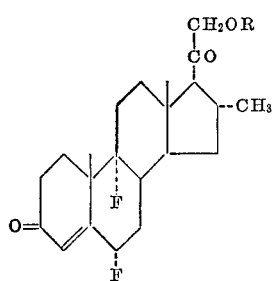

which compound is hydroxylated at the 11-carbon atom by biochemical means, dehydrated in 1-position by dehydrogenating acting microorganisms, or by chemical dehydrogenating agents, and, if desired, selectively acylating the 21-position hydroxyl group in the case wherein R is hydrogen.

It has further been found that compounds of the above type wherein both $R_2$ and $R_3$ are halogens, for example compounds of the Formula III above, can be produced from starting materials which do not contain a 9α-position halogen, e.g. fluorine atom, for example starting from compounds of the following formula:

(V)

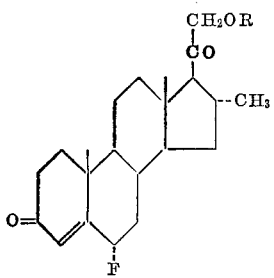

and after hydroxylating the same in 11-position converting the 11-position introduced hydroxyl group into the 9α-fluoro-11β-hydroxy-grouping to obtain the final desired 11-hydroxylated compound.

This method has the advantage that it makes no difference whether the primary 11-hydroxylation results in an 11α-hydroxyl group or an 11β-hydroxyl group.

This method is illustrated by the following series of formulas, in which the method steps from the starting compound of Formula V to the respective 11-hydroxylated product is omitted in order to give a more clear picture.

METHOD 1

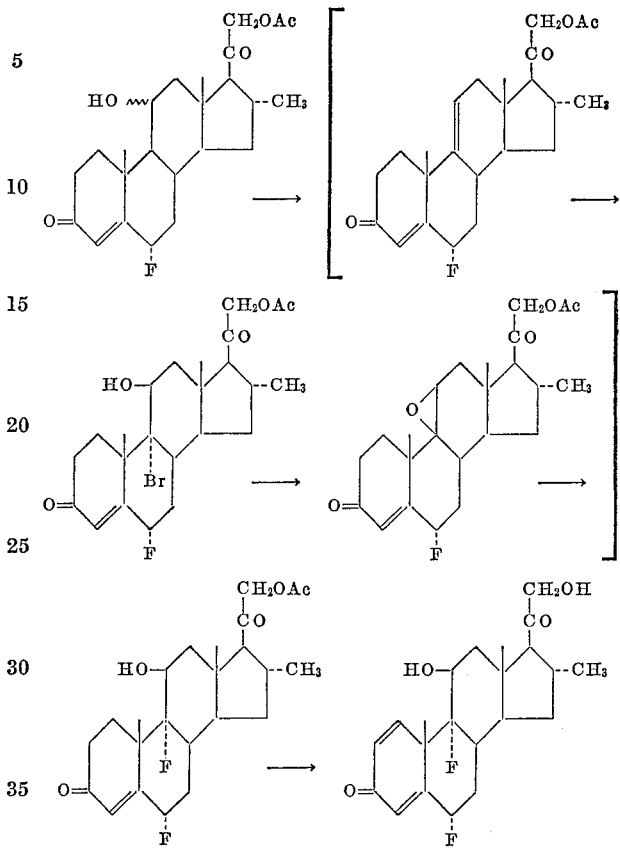

METHOD 2

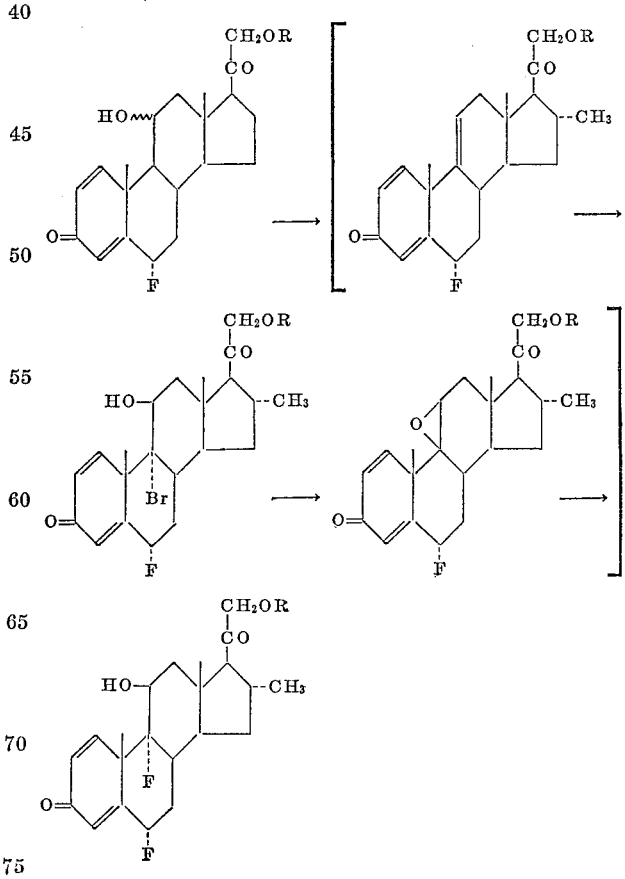

The new compounds of the present invention possess marked therapeutic activity in the treatment of inflammation diseases.

The compounds of the present invention have remarkably little side reactions, for example with respect to influence of the mineral balance, despite the mineralocorticoid type of structure of the compounds.

This is illustrated by the following table wherein WD 50 (="active dose 50") is the dose of the tested substance which, according to A. Robert and J. E. Nezamis (Acta Endocrinologica Vol. 25, (1957), page 105) anti-inflammation test gives an attenuation of the exudate formation of 50% compared to the untreated controls, and wherein "Doc"=desoxycorticosterone:

*Table 1*

| | Granuloma test WD 50 in mg. | | Percent of action on the Na/K quotient which is exerted by 10 γ Doc. at a dosage which corresponds to the WD 50 in the granuloma test |
|---|---|---|---|
| | Local | P.O. | |
| Hydrocortisone acetate | 0.055 | 3.8 | 45 |
| Dexamethasone | 0.0065 | 0.08 | 70 |
| Fluorhydrocortisone acetate | 0.01 | 0.14 | 145 |
| 16α-methyl-1,4-pregnadiene-11β,21-diol-3,20-dione | 0.01 | 0.24 | 30 |
| 6α-fluor-16α-methyl-1,4-pregnadiene-11β,21-diol-3,20-dione | 0.01 | 0.02 | |

The anti-inflammation action of the compounds of the present invention is particularly marked upon peroral administration, as shown in Table 2 below in which the action of 16α - methyl - 6α,9α-difluoro-1-dehydrocorticosterone (I) is compared with 6α,9α-difluoro-1-dehydrocorticosterone (II) and 16α-methyl-9α-fluoroprednisolone (III). The anti-inflammation action was determined on male rats weighing about 150 g. each. After oral administration of the active ingredient in the form of a gum arabic-suspension by means of the known granuloma pouch test. The obtained value was compared in relation to hydrocortisone acetate (IV) which was used as the standard substance and was given an anti-inflammation action equal to 1.

The glyconeogenetic action was determined on mice using the customary liver glycogen test. The catabolic and adrenal inhibiting actions were tested on growing female rats weighing about 40–50 g. over a 14 day period following subcutaneous administration of the test substance. The applied dosage to determine the degree of side effect was so chosen that with compounds I, II and III the same anti-inflammatory action was obtained. Hydrocortisone acetate again served as the standard substance for this test. The values, particularly the surprisingly low corresponding activity quotients prove that the compound of the present invention, compound I, as compared to the comparison substances II and III, with regard to the undesired side effects exhibits markedly superior properties.

Because of the exceedingly low side effects, particularly on the glycogen balance, the catabolic effect and the adrenal inhibiting effect, the compounds of the present invention are not only suitable for the treatment of external inflammatory diseases, such as skin diseases of all type, but are also suitable for the treatment of internal inflammatory diseases, such as kidney inflammation, liver inflammation, polyarthritis, and the like diseases, by oral administration.

The anti-inflammatory action of the compounds of the present invention is further illustrated in Table 3 below in which compounds of the present invention were compared in the granuloma pouch test to hydrocortisone acetate (IV), which was given the anti-inflammatory activity of 1, after oral administration of the tested compounds. The values are set forth in the table:

*Table 3*

| | P.O. |
|---|---|
| 16α - methyl - 6α - fluoro - 9α - chloro-Δ¹,⁴ - pregnadiene - 11β,21 - diol - 3,20-dione (V) | 100–300×IV. |
| 16α - methyl - 6α - fluoro - 9α - chloro-Δ¹,⁴ - pregnadiene - 11β,21 - diol - 3,20-dione-21-acetate (VI) | 130×IV. |
| 16α - methyl - 9α - chloro - Δ¹,⁴ - pregnadiene - 11β,21 - diol-3,20-dione (VII) | 100–130×IV. |
| 16α - methyl - 9α - chloro - Δ¹,⁴ - pregnadiene - 11β,21 - diol - 3,20 - dione - 21-acetate (VIII) | 38×IV. |

*Table 2*

| Active substance | A<br>Arrestation of inflammation | B<br>Glycogen action | | C<br>Catabolic action | | D<br>Adrenal inhibiting activity | |
|---|---|---|---|---|---|---|---|
| | | Compared to IV | Activity quotient | Compared to IV | Activity quotient | Compared to IV | Activity quotient |
| I | 1,300×IV | 30×IV | 0.023 | 110×IV | 0.083 | 200×IV | 0.154 |
| II | 3.8×IV | 6×IV | 1.6 | 5×IV | 1.3 | 40×IV | 10.5 |
| III | 380×IV | 30×IV | 0.079 | 80×IV | 0.21 | 100×IV | 0.416 |

The value of an active substance is arrived at not only by determining the superior absolute values of the desired action, for example the anti-inflammatory action, but it is also determined in general by the extent of the undesired side effects of a substance, it being well known that with a produced increase in activity in a series there is also obtained a corresponding increase in the side effects.

In the instant case it was therefore quite surprising that the significant increase of the anti-inflammatory action of the compound I, namely 16α-methyl-6α,9α-difluoro-1-dehydrocorticosterone is accompanied by only a slight increase in the undesired glycogen, catabolic and andrenal inhibition side effects (compare columns B, C and D of Table 2).

The compound 6α-fluoro-16α-methyl-Δ¹,⁴-pregnadiene-11β,21-diol-3,20-dione (IX) was also compared to 6α-fluoro-Δ¹,⁴-pregnadiene-11β,21-diol-3,20-dione (X) with respect to the desired anti-inflammatory action, as well as with respect to the undesired glycogen and catabolic side effects. The values are set forth in Table 4 below in which the compounds tested were compared with hydrocortisone acetate (IV), which was given an anti-inflammatory action of 1.

For medical purposes the compounds of the present invention can be used in all common administration forms, for example as salves, powder or tinctures for external application, or as tablets, powder, suspensions, capsules or also as injection preparations for internal administration. The medicinal preparations are produced Table 4

| Substance | Arrestation of inflammation P.O. | Glycogen action | | Catabolic action | |
|---|---|---|---|---|---|
| | | In comparison to IV | Activity quotient | In comparison to IV | Activity quotient |
| IX | 200×IV | 2.5×IV | 1/80=0.0125 | 10.0×IV | 1/20=0.05 |
| X | 0.4×IV | 2×IV | 1/0.2=5 | 1.25×IV | 1/0.32=3.13 | in known methods by working up of the active agent with the common pharmaceutical carriers.

The following examples are given to further illustrate the present invention. The scope of the invention is not, however, meant to be limited to the specific details of the examples.

EXAMPLE I (a) *Production of 16α-methyl-4-pregnene-11β,21-diol-3, 20-dione (=16α-methylcorticosterone)*

A fermenter of rust-free steel having a 50 liter capacity is charged with 30 liters of a nutrient solution containing:

| | Percent |
|---|---|
| Glucose (starch sugar) | 4.4 |
| Malt extract | 1.0 |
| NaNO$_3$ | 0.3 |
| KH$_2$PO$_4$ | 0.1 |
| KCl | 0.05 |
| MgSO$_4$ | 0.05 |
| FeSO$_4$ | 0.002 |
| Corn steep | 0.5 | sterilized for one half hour at 120° C. and after cooling, inoculated with a spore suspension of *Curvularia lunata* which is obtained by rinsing a seven day corn culture (15 g. corn) with approximately 100 cc. of physiological sodium chloride solution.

After two days of culturing at 25° C. under stirring (220 revolutions per minute) and ventilating (1.65 m.$^3$/hour), 1.8 liters of the obtained culture are removed under sterile conditions and introduced into a fermenter of the same size charged with 28.2 liters of a nutrient solution containing:

| | Percent |
|---|---|
| Glucose (starch sugar) | 4.4 |
| Malt extract | 1.0 |
| NaNO$_3$ | 0.3 |
| KH$_2$PO$_4$ | 0.1 |

After 24 hours cultivation under stirring and ventilation as described above, 7.5 g. of 16α-methyldesoxycorticosterone obtained by saponification of the corresponding 21-acetate and melting at 102–104° C. in 200 cc. of ethanol are added and fermented under the same conditions for 28 hours.

The course of the fermentation is tested by removal of samples, which are extracted with methyl isobutyl ketone. The extract is analyzed by paper chromatography in a system of dioxane+toluene/propylene glycol.

After the end of the fermentation (28 hours) the culture broth is filtered off by suction over a large suction filter. The mycel residue is washed with water several times. The filtrate is extracted three times, each time with 10 liters of methyl isobutyl ketone. The extract is concentrated under vacuum in a circulating evaporator and in a round flask carefully dried under vacuum. The residue is crystallized from acetone/isopropyl ether. The melting point is 157–158° C. (fermentation yield=60%).

The pure product yield obtained after a second crystallization and chromatography of the mother liquor on silica gel amounts to 53% of the theoretical.

*Analysis.*—C$_{22}$H$_{32}$O$_4$ (360.5), $\epsilon_{240}$=15,400. Calculated: C, 73.3; H, 9.0; O, 17.7. Found: C, 73.1; H, 9.2; O, 17.2.

(b) *Production of 16α-methyl-1,4-pregnadiene-11β,21-diol - 3,20 - dione (=16α - methyl-1-dehydro-corticosterone)*

A fermenter made of rust-free steel and having a 50 liter capacity is charged with 30 liters of a nutrient solution containing 1% glucose and 0.2% corn steep and sterilized as described in Example I(a) above. It is then innoculated with a bacterial suspension of *Corynebacterium simplex*, which is obtained by rinsing a bouillon agar surface plate of 64 cm.$^2$ with 7 cc. of physiological sodium chloride solution.

After 24 hours of culturing under the conditions of Example I(a) above, 1.8 liters of the obtained culture are removed under sterile conditions and transferred into a fermenter containing 28.2 liters of the same medium. At the same time there is added a solution of 7.5 g. of 16α-methyl-corticosterone of Example I(a) in 150 cc. of ethanol and the same is fermented under the same conditions for 16 hours at 25° C.

The course of the fermentation (14 hours) is again tested by removal of samples which are extracted with methyl isobutyl ketone. The extracts are analyzed by polarographic methods.

The cultured broth, without filtration, is extracted three times, each time with 10 liters of methyl isobutyl ketone. The extract is worked up as described under 1(a) above. The residue, after recrystallization two times from acetone/isopropyl ether results in 4.5 g. of a crystalline product melting at 191/192–193.5° C.

By chromatography of the mother liquor an additional 2 g. is obtained. The total yield amounts to 87% of the theoretical.

*Analysis.*—C$_{22}$H$_{30}$O$_4$ (358.48). Calculated: C, 73.75; H, 8.4; O, 17.85. Found: C, 73.7; H, 8.9; O, 18.0. $\gamma_{242}$=15,100.

(c) *Production of 16α-methyl-1,4-pregnadiene-11β,21-diol - 3,20 - dione-21-acetate (=16α-methyl-1-dehydrocorticosterone-21-acetate)*

500 mg. of 16α-methyl-1-dehydro-corticosterone obtained from Example I(b) above are allowed to stand in 3 cc. of pyridine with 1.5 cc. of acetanhydride for two hours at room temperature and thereafter 20 cc. of 8% sulfuric acid are introduced at 0° C. After one hour the crystalline product is filtered off under suction, washed with water and dried. There is obtained 558 mg. of a crude product which is recrystallized from a small amount of ethanol. The final yield is 492 mg. of the compound which melts at 204–205° C. The yield corresponds to 87% of the theoretical.

*Analysis.*—C$_{24}$H$_{32}$O$_5$ (400.5). Calculated: C, 72.0; H, 8.1; O, 19.95. Found: C, 71.7; H, 8.4; O, 20.4. $\epsilon_{242}$=15,020.

EXAMPLE II (a) *Production of 16α-methyl-Δ$^4$-pregnene-21-ol-3, 11,20-trione*

2 g. of 16α-methylcorticosterone obtained according to Example I(a) are dissolved in 120 cc. of 96% acetone, mixed with 1.4 g. of N-bromacetamide are allowed to stand for three hours at room temperature. 600 cc. of water are stirred in and the reaction mixture is then extracted four times, each time with 100 cc. of methylene chloride. The extract is washed until neutral, dried over sodium sulfate and concentrated under vacuum. The residue (2.1 g.) is subjected to chromatography over silica gel. 1.4 g. of the crude 11-keto compound are eluated with $CH_2Cl_2:CHCl_3$ (1:1) and $CHCl_3$. There is obtained after recrystallization from chloroform-isopropyl ether 900 mg. of the product melting at 176/179–181° C. The yield amounts to 44% of the theoretical.

Analysis.—$C_{22}H_{30}O_4$ (358.5). Calculated: C, 73.7; H, 8.4; O, 17.9. Found: C, 71.7; H, 8.5; O, 17.6. $\epsilon_{237}=15,120$.

(b) *Production of 16α-methyl-$\Delta^{1,4}$-pregnadiene-21-ol-3, 11,20-trione from 16α-methyl-$\Delta^4$-pregnene-21-ol-3,11, 20-trione*

16α-methyl-$\Delta^4$-pregnene-21-ol-3,11,20-trione, produced according to Example II(a), are dehydrogenated by means of *Corynebacterium simplex* as described in Example I(b) to obtain 16α-methyl-$\Delta^{1,4}$-pregnadiene-21-ol-3,11,20-trione, which is identical with the product produced according to Example II(c), below.

(c) *Production of 16α-methyl-$\Delta^{1,4}$-pregnadiene-21-ol-3, 11,20-trione from 16α-methyl-$\Delta^{1,4}$-pregnadiene-11β,21-diol-3,20-dione*

1 g. of 16α-methyl-$\Delta^1$-dehydro-corticosterone (see Example II(a) are oxidized and further worked up as described in Example I(b) with 60 cc. of 96% acetone and with 720 mg. of N-bromacetamide for 3 hours. There is thus obtained 1.2 g. of the crude product, which after chromatographic purification on silica gel and recrystallization from ethyl acetate-hexane yields 430 mg. (43% of the theoretical) of the pure 11-keto compound which melts at 160/161–163° C.

Analysis.—$C_{22}H_{28}O_4$ (356.46). Calculated: C, 74.2; H, 7.9; O, 17.9. Found: C, 73.5; H, 8.2; O, 17.8. $\epsilon_{237}=15,120$.

(d) *Production of 16α-methyl-$\Delta^{1,4}$-pregnadiene-21-ol-3, 11,20-trione-21-acetate*

550 mg. of 16α-methyl-$\Delta^1$-dehydrocorticosterone-21-acetate obtained from Example I(c) are dissolved in 92 cc. of 96% acetone, oxidized by means of 1.1 g. of N-bromacetamide for three hours at room temperature as described in Example II(a), and then further worked up. There is thus obtained 550 mg. of the crude product which is subjected to chromatography on silica gel. The methylene chloride eluate contains 390 mg. of the crystalline substance, which after recrystallization from a small amount of ethanol results in 286 mg. of the pure product which melts at 207/209–210° C.

Analysis.—$C_{24}H_{30}O_5$ (398.5). Calculated: C, 72.3; H, 7.6; O, 20.1. Found: C, 71.6; H, 7.9; O, 20.1. $\epsilon_{237}=14,820$.

EXAMPLE III (a) *Production of 16α-methyl-$\Delta^4$-pregnene-14, 21-diol-3,20-dione*

A fermenter of rust-free steel having a 50 liter capacity is charged with 30 liters of a nutrient solution containing:

| | Percent |
|---|---|
| Saccharose | 5 |
| Beet sugar molasses | 1 |
| $NaHCO_3$ | 0.2 |
| $KH_2PO_4$ | 0.1 |
| KCl | 0.05 |
| $FeSO_4$ | 0.001 |
| $MgSO_4$ | 0.05 |
| Corn steep (ph 7) | 0.5 | heated for one half hour at 120° C. to sterilize it and after cooling is inoculated with a spore suspension of *Curvularia lunata* which is obtained by rinsing a seven day corn culture (15 g. corn) with approximately 100 cc. of physiological sodium chloride solution.

After two days of growth at 25° C. under stirring (220 revolutions per minute) and ventilation (1.65 m.³/hour), 1.8 liters of the obtained culture are removed under sterile conditions and introduced into a 50 liter fermenter containing 30 liters of a nutrient solution containing:

| | Percent |
|---|---|
| Saccharose | 5 |
| Beet sugar molasses | 1 |
| $NaNO_3$ | 0.2 |
| $KH_2PO_4$ | 0.1 |

After 24 hours of growth under stirring (110 revolutions per minute) and ventilation (8 m.³/hour), 7.5 g. of 16α-methyl-$\Delta^4$-pregnene-21-ol-3,20-dione in 200 cc. of ethanol are added and the fermentation is continued for 28 hours under the same conditions.

The course of the fermentation is tested by the removal of samples, which are extracted with methyl isobutyl ketone. The extracts are subjected to paper chromatography in a system of dioxane+toluene/propylene glycol for analysis.

After the end of the fermentation the culture broth is filtered off under suction and extracted with methyl isobutyl ketone. The extract is concentrated under vacuum and the residue is subjected to chromatography on silica gel to separate the 11β- and the 14α-hydroxylated compounds. The fractions with 16α-methyl-$\Delta^4$-pregnene-14α, 21-diol-3,20-dione are acetylated as the crude product, as follows:

6 g. of the crude product in 20 cc. of pyridine with 10 cc. of acetanhydride are allowed to stand for 3 hours at room temperature and then 120 cc. of 8% sulfuric acid at 0° C. are stirred in. After 1 hour the crystalline product is filtered off under suction, washed with water, dried, and then recrystallized from isopropyl ether. 1.7 g. of the compound is obtained, the compound melting at 192/193–194° C.

Analysis.—$C_{24}H_{34}O_5$ (402.5). Calculated: C, 71.7; H, 8.5; O, 19.9. Found: C, 70.4; H, 9.0; O, 20.1. $\epsilon_{240}=15,200$.

(b) *Production of 16α-methyl-$\Delta^{1,4}$-pregnadiene-14α,21-diol-3,20-dione*

16α-methyl-$\Delta^4$-pregnene-14α,21-diol 3,20-dione are dehydrogenated with *Corynebacterium simplex* as described in Example I(b), thereby obtaining 16α-methyl-$\Delta^{1,4}$-pregnadiene-14α,21-diol-3,20-dione.

EXAMPLE IV (a) *Production of 16α-methyl-6α-chloro-$\Delta^4$-pregnene-11β,21-diol-3,20-dione*

16α - methyl - 6α - chloro - $\Delta^4$ - pregnene - 21 - ol - 3,20-dione are, analogously to Example I(a), hydroxylated in 11β-position. The hitherto unknown starting material 16α - methyl - 6α - chloro - $\Delta^4$ - pregnene - 21 - ol - 3,20-dione (melting point—171–173° C.), and its 21-acetate (melting point 144–145.5° C.) is obtained from 16α-methyl-$\Delta^5$-pregnene-3β-ol-20-one-acetate by addition of chlorine onto the 5–6 double bond, saponification of the 3-acetoxy group, bromination of the 21-position methyl, reaction of the introduced 21-bromine atom with potassium acetate, oxidation of the 3-position hydroxyl to the keto group, subsequently splitting off of hydrogen chloride, and if desired saponification of the 21-acetoxy group.

(b) *Production of 16α-methyl-6α-chloro-$\Delta^{1,4}$-pregnadiene 11β,21-diol-3,20-dione*

16α - methyl - 6α - chloro - $\Delta^4$ - pregnene - 11β,21 - diol-3,20-dione is dehydrogenated with *Cornynebacterium simplex* as described in Example I(b), and there is thus obtained 16α - methyl - 6α - chloro - $\Delta^{1,4}$ - pregnadiene-11β,21-diol-3,20-dione.

EXAMPLE V

(a) 16α-methyl-6α-fluoro-Δ⁴-pregnene-11β,21-diol-3,20-dione

16α - methyl - 6α - fluoro - Δ⁴ - pregnene - 21 - ol - 3,20-dione-21-acetate (M.P.: 132/134–138° C., UV $\epsilon_{236}$= 15,000) is hydroxylated with *Curvularia lunata* in 11β-position using the fermentation method previously described in Example I(a), whereby the 21-acetate group is simultaneously saponified. The hitherto unknown starting material 16α-methyl-6α-fluoro-Δ⁴-pregnene-21-ol-3,20-dione-21-acetate is obtained from 16α-methyl-Δ⁵-pregnene - 3β,21 - diol - 20 - one - 21 - acetate (M.P. 152–154° C.) by the addition of bromofluorine (from N-bromoacetamide and hydrogen fluoride) onto the 5–6 double bond, oxidation of the 3β-hydroxyl group with chromic acid, introduction of the Δ⁴-double bond by splitting of the hydrogen bromide and acid isomerization of the 6β-fluoro substituent to the 16α-methyl-6α-fluoro-Δ⁴-pregnene-21-ol-3,20-dione-21-acetate.

By chromatographic purification on silica gel the 16α - methyl - 6α - fluoro - Δ⁴ - pregnene - 11β,21 - diol-3,20-dione is M.P. 166/167–171°; $\epsilon_{236}$=14,400.

(b) 16α-methyl-6α-fluoro-Δ⁴-pregnene-11β,21-diol-3,20-dione-21-acetate

By reaction of the compound of Example V(a) with acetanhydride in pyridine at room temperature as described in Example I(c), the acetate is obtained and recrystallized from ethyl acetate.

M.P. 248/249–251° C.; $\epsilon_{236}$=14,000.

(c) 16α-methyl-6α-fluoro-Δ¹,⁴-pregnadiene-11β,21-diol-3,20-dione

16α - methyl - 6α - fluoro - Δ⁴ - pregnene - 11β,21 - diol-3,20-dione is dehydrogenated with *Cornynebacterium simplex* as described in Example I(b). The extraction residue is subjected to chromatography on silica gel and after recrystallization there is obtained from a methylene chloride-isopropyl ether 16α-methyl-6α-fluoro-Δ¹,⁴-pregnadiene-11β,21-diol-3,20-dione.

M.P. 180/181–182° C.; $\epsilon_{241}$=15,320.

(d) 16α-methyl-6α-fluoro-Δ¹,⁴-pregnadiene-11β,21-diol-3,20-dione-21-acetate

16α - methyl - 6α - fluoro - Δ¹,⁴ - pregnadiene - 11β,21-diol-3,20-dione are acetylated as described in Example I(c) above and the product is recrystallized from methylene chloride/isopropyl ether.

M.P. 232/233–235° C.; $\epsilon_{240}$=15,860.

EXAMPLE VI

(a) 16α-methyl-6α-fluoro-Δ⁴-pregnene-14α,21-diol-3,20-dione

The mother liquor of Example V(a) upon additional chromatography permits the isolation of 16α-methyl-Δ⁴-pregnene-14α,21-diol-3,20-dione. After recrystallization from ethyl acetate:

M.P. 250/252–253° C.; $\epsilon_{235}$=14,000.

(b) 16α-methyl-6α-fluoro-Δ⁴-pregnene-14α,21-diol-3,20-dione-21-acetate

16α - methyl - 6α-fluoro-Δ⁴-pregnene-14α,21-diol-3,20-dione are acetylated as described in Example I(c) above, and recrystallized from ethanol/isopropyl ether.

M.P. 179/180–182° C.; $\epsilon_{236}$=14,400.

(c) 16α-methyl-6α-fluoro-Δ¹,⁴-pregnadiene-14α,21-diol-3,20-dione

16α - methyl - 6α-fluoro-Δ⁴-pregnene-11β,21-diol-3,20-dione are dehydrogenated with *Corynebacterium simplex* as described in Example I(b) above. The extraction residue is subjected to chromatography on silica gel and after recrystallization from ethyl acetate there is obtained 16α - methyl-6α-fluoro-Δ¹,⁴-pregnadiene-14α,21-diol-3,20-dione.

M.P. 241/242–243° C.; $\epsilon_{242}$=16,500.

(d) 16α-methyl-6α-fluoro-Δ¹,⁴-pregnadiene-14α,21-diol-3,20-dione-21-acetate

16α-methyl-6α-fluoro-Δ¹,⁴-pregnadiene-14α,21-diol-3,20-dione are acetylated as described in Example I(c) and recrystallized from ethyl acetate.

M.P. 220/223–236° C.; $\epsilon_{241}$=15,500.

EXAMPLE VII

(a) 16α-methyl-Δ¹,⁴-pregnadiene-14α,21-diol-3-20-dione

Analogously to Example I(b) 30 liters of a sterile nutrient solution containing 0.1% yeast extract, 0.5% corn steep and 0.2% glucose are inoculated with a bacterial suspension of *Bacillus lentus* Mutant MB 284. After 24 hours of culturing, 1.8 liters of the culture broth are transferred into 28.2 liters of a sterile medium of the same composition. At the same time, 7.5 g. of 16α-methyl-Δ⁴-pregnene-14α,21-diol-3,20-dione in 150 cc. of ethanol are added and the fermentation is continued for 30 hours at 25° C. The culture broth is further worked up as described in Example I(b), whereby there is obtained 5.2 g. of crystalline crude product which is recrystallized from ethyl acetate. The yield is 3.7 g. and the compound melts at 242/244–246° C.

*Analysis.*—C₂₂H₃₀O₄ (358.5). Calculated: C, 73.8; H, 8.4; O, 17.8. Found: C, 73.6; H, 8.5; O, 18.5. $\epsilon_{243}$=15,750.

(b) 16α-methyl-Δ¹,⁴-pregnadiene-14α-21-diol-3,20-dione-21-acetate 320 mg. of 16α-methyl-Δ¹,⁴-pregnadiene-14α-21-diol-3,20-dione are acetylated in 3 cc. of pyridine with 1.5 cc. of acetic acid anhydride for 2 hours at room temperature, as described in Example I(c), and then further worked up. The crude product is recrystallized form ethyl acetate. The compound melts at 208/209–210° C.

*Analysis.*—C₂₄H₃₂O₅ (400.52). Calculated: C, 72.1; H, 8.06; O, 19.84. Found: C, 71.96; H, 9.97; O, 19.95. $\epsilon_{245}$=15,830.

EXAMPLE VIII

(a) 16α-methyl-9α-fluoro-Δ⁴-pregnene-11β,21-diol-3,20-dione

As described in Example I(a), 7.5 g. of 16α-methyl-9α - fluoro - Δ⁴-pregnene-21-ol-3,20-dione-21-acetate, obtained from 16α-methyl-Δ⁴-pregnene-11β,21-diol-3,20-dione (see Example 1a) by acetylating with acetic anhydride in pyridine followed by reaction of the thus formed 21-acetate (melting at 193.5–194.5° C.- with hydrogen fluoride in pyridine at 0° are fermented for 36 hours with *Curvularia lunata* (Mutant NRRL 2380), whereby the 21-acetate group is simultaneously saponified, and then further worked up. The residue is extracted with methyl isobutyl ketone, subjected to chromatography on silica gel and there is obtained from chloroform/ethyl acetate (2:1) an eluate containing the 11β-hydroxyl compound, which is further dehydrogenated as the crude product.

(b) 16α-methyl-9α-fluoro-Δ¹,⁴-pregnadiene-11β,21-diol-3,20-dione

16α - methyl - 9α-fluoro-Δ⁴-pregnene-11β,21-diol-3,20-dione obtained as the crude product under Example VIII(a) above, is fermented with *Bacillus lentus* for 30 hours and further worked up, as described in Example VII(a). The residue is extracted with methyl isobutyl ketone and there is obtained as the crude product 16α-methyl-9α-fluoro-Δ¹,⁴-pregnadiene-11β,21-diol-3,20-dione.

(c) *16α-methyl-9α-fluoro-Δ$^{1,4}$-pregnadiene-11β,21-diol-3,20-dione-21-acetate*

16α-methyl-9α-fluoro-Δ$^{1,4}$-pregnadiene-11β,21-diol-3,20-dione are acetylated as described in Example I(c) as the crude product, and further worked up. The obtained crude acetate is recrystallized from isopropyl ether/methyl chloride. The melting point=220–226° C.

UV.—$\epsilon_{239}$=15,600.

EXAMPLE IX (a) *6α,16α-dimethyl-Δ$^4$-pregnene-11β,21-diol-3,20-dione*

As described in Example I(a) 6α,16α-dimethyl-Δ$^4$-pregnene-21-ol-3,20-dione-21-acetate (M.P. 120–121° C.) is fermented with *Curvularia lunata* in 11β-position, whereby the 21-acetate group is simultaneously saponified. The hitherto unknown starting material 6α,16α-dimethyl-Δ$^4$-pregnene-21-ol-3,20-dione-21-acetate is obtained from 6β,16α - dimethyl - pregnane - 3β,5α-diol-20-one (R. P. Graber Chem. and Ind. 1960, 1478) by treatment with bromine in ether, reaction of the introduced 21-bromine atom with potassium acetate, oxidation of the 3β-position hydroxyl with chromic acid, introduction of the Δ$^4$-double bond by dehydration with hydrogen chloride in acetic acid whereby the 6β-methyl group is simultaneously isomerized.

By chromatography on silica gel the 6α-16α-dimethyl-Δ$^4$-pregnene-11β,21-diol-3,20-dione is isolated. M.P. 65–67.5° C.

(b) *6α,16α-dimethyl-Δ$^4$-pregnene-11β,21-diol-3,20-dione-21-acetate*

By reaction with acetanhydride in pyridine at room temperature as described in Example I(c) the acetate is obtained.

(c) *6α,16α-dimethyl-Δ$^{1,4}$-pregnadiene-11β,21-diol-3,20-dione*

6α,16α-dimethyl-Δ$^4$-pregnene-11β,21-diol-3,20-dione is dehydrogenated with *Corynebacterium simplex* as described in Example I(b).

(d) *6α,16α-dimethyl-Δ$^{1,4}$-pregnadiene-11β,21-diol-3,20-dione-21-acetate*

6α,16α - dimethyl-Δ$^{1,4}$-pregnadiene-11β,21-diol-3,20-dione is acetylated as described in Example I(c).

EXAMPLE X.—REACTION MECHANISM METHOD 1 ILLUSTRATED ABOVE (a) *Production of 6α-fluoro-16α-methyl-4,9(11)-pregnadiene-21-ol-3,20,-dione-21-acetate*

10 g. of 6α-fluoro-16α-methyl-Δ$^4$-pregnene-11β,21-diol-3,20-dione-21-acetate are dissolved in 8.8 cc. of pyridine and 50 cc. of dimethylformamide and warmed under nitrogen to a temperature of +70° C. 4.42 cc. of methyl chloride are then added and the temperature is maintained at 80–85° C. for 30 minutes. After cooling to 20° C. the solution is stirred into 900 cc. of ice water. The precipitate is filtered off under suction and dried. The crude product amounts to 9.25 g. (97.5% of the theoretical). The melting point is 160/164–167° C. α$_D$ +112.3° CHCl$_3$; $\epsilon_{234}$=15,100.

(b) *Production of 6α-fluoro-9α-bromo-16α-methyl-Δ$^4$-pregnene-11β,21-diol-3,20-dione-21-acetate*

A solution of 6.02 g. of dibromodimethylhydantoin in 10 cc. of distilled water and 25.4 cc. of dioxane is added at 20° C. to a solution of 10 g. of 6α-fluoro-16α-methyl-4,9(11)-pregnadiene-21-ol-3,20-dione-21-acetate in 125 cc. of dioxane, and then the mixture is stirred for an additional 10 minutes. A solution of 0.845 cc. of perchloric acid in 13.4 cc. of distilled water is then added and in time intervals of 15 minutes each, 2 cc. of the reaction mixture each time is titrated with 1/10 n. Na$_2$S$_2$O$_3$ solution against starch. The time of the reaction (60–75 minutes) is ended when no more HOBr is needed. 3.77 g. of sodium acetate 3H$_2$O and 2.42 g. of sodium sulfite in 25 cc. of water are added for neutralization, whereby the temperature is maintained at a maximum of 23° C. After the neutralization, the text with potassium iodide starch paper should give a negative result and the pH value is between 5.6 and 7. 150 cc. of methanol is then added. The inorganic precipitate is filtered off under suction and the filter residue subsequently washed with a mixture of 26.8 cc. of methanol:dioxane (1:1). 442 cc. of distilled water are added under stirring to the filtrate at +15° C. The precipitate is stirred for two hours at +5° C. and the precipitated substance then filtered off under suction and dried at 20° C. under vacuum over KOH. The yield is 10.8 g. (86.5% of the theoretical) of the crude product. The melting point is 162/164° C. (with decomposition).

(c) *Production of 6α-fluoro-16α-methyl-9β,11β-oxido-Δ$^4$-pregnene-21-ol-3,20-dione-21-acetate*

10 g. of 6α-fluoro-9α-bromo-16α-methyl-Δ$^4$-pregnene-11β,21-diol-3,20-dione-21-acetate are added at 50° C. to a solution of 8.7 g. of potassium acetate in 104 cc. of ethyl alcohol and the reaction mixture is cooked under refluxing for 75 minutes. After cooling to +10° C., 247 cc. of water are added dropwise in such manner that the temperature of the reaction solution does not increase to above +15° C. The reaction mixture is subsequently further stirred for 2 hours under ice cooling and filtered off under suction. The crude product is recrystallized from methanol with the addition of carbon. The yield is 7.32 g. (88% of the theoretical). The melting point is 153/154.5–156° C.

$\epsilon_{237}$=13,000; [α]$_D$+72.1° (CHCl$_3$).

(d) *Production of 6α,9α-difluoro-16α-methyl-Δ$^4$-pregnene-11β,21-diol-3,20-dione-21-acetate*

8 cc. of hydrogen fluoride are added at 0° C. to a mixture of 90 cc. of chloroform and 10 cc. of ethanol, and subsequently during a time period of 15 miutes a solution of 10 g. of 6α-fluoro-16α-methyl-9β,11β-oxido-Δ$^4$-pregnene-21-ol-3,20-dione-21-acetate in 90 cc. of chloroform are added. The reaction mixture is then further stirred for 2 hours at 0 to 5° C. For neutralization there is added at a maximum temperature of +5° C., 30.75 g. of potassium carbonate dissolved in 30 cc. of water. After the addition of a 5% sodium bicarbonate solution, the neutralization is completed to a pH value of 6.5. The chloroform solution is again washed with water, dried and concentrated to dryness under vacuum. The residue is recrystallized first from methanol-chloroform with the addition of carbon and subsequently from chloroform-benzene. The yield is 5.0 g. (47% of the theoretical). The melting point is 229/232–234° C. α$_D$ +133.8° CHCl$_3$; $\epsilon_{233}$=16,000.

(e) *Production of 6α,9α-difluoro-16α-methyl-Δ$^{1,4}$-pregnadiene-11β,21-diol-3,20-dione.*

16α-methyl-6α,9α-difluoro-Δ$^4$-pregnene-11β,21-diol-3,20-dione-21-acetate (melting point=229/232–234° C. (with decomposition)) is dehydrogenated in 1,2-position by means of *Bacillus lentus*, Mutant MB 284, whereby the 21-acetate group is simultaneously saponified. (It is possible under the same conditions to start with the free 21-hydroxyl compound.)

For this purpose a fermenter made of stainless steel having a 50 liter capacity is charged with 30 liters of a nutrient solution of 0.1% yeast extract, 0.5% cornsteep and 0.2% glucose, heated for one half hour at 120° C. for sterilization purposes, and after cooling, innoculated with a bacterial suspension of *Bacillus lentus* MB 284. After 24 hours of growth at 28° C. under stirring (220 revolutions per minute) and aeration (1.65 m.$^3$/hour), 1.8 liters of the obtained culture is removed under sterile conditions and transferred with 28 liters of the same sterilized nutrient medium into a fermenter of the same size.

Simultaneously, 6 g. of 16α-methyl-6α,9α-difluoro-Δ⁴-pregnene-11β,21-diol-3,20-dione-21-acetate in 200 cc. of dimethylformamide are added and the fermentation is continued for 50 hours under the same conditions.

The course of the fermentation is tested by removal of samples which are extracted with methyl isobutyl ketone. The extracts are analyzed by thin layer chromatography using a system of benzene/ethyl acetate (4:1).

After further working up analogously to Example I there is obtained an oily-crystalline residue which is subjected to chromatography on silica gel. The 16α-methyl-6α,9α-difluoro-Δ$^{1,4}$-pregnadiene-11β,21-diol-3,20-dione is eluated with ethyl acetate-chloroform (1:2), it is recrystallized from ethyl acetate/ether and then found to melt at 240/242–244° C. The yield is 60% of the theoretical.

$\epsilon_{237}=16,600$.

EXAMPLE XI.—THE REACTION MECHANISM OF METHOD 2 ILLUSTRATED ABOVE (a) *Production of 6α-fluoro-16α-methyl-Δ$^{1,4,9(11)}$-pregnatriene-21-ol-3,20-dione-21-acetate*

10 g. of 6α-fluoro-16α-methyl-Δ$^{1,4}$-pregnadiene-11β,21-diol-3,20-dione-acetate are dehydrogenated as described in Example X(a). The compound melts at 164–165° C. (from methanol).

$\epsilon_{238}=16,750$.

(b) *Production of 6α-fluoro-9α-bromo-16α-methyl-Δ$^{1,4}$-pregnadiene-11β,21-diol-3,20-dione-21-acetate*

10 g. of 6α-fluoro-16α-methyl-Δ$^{1,4,9(11)}$-pregnatriene-21-ol-3,20-dione-21-acetate are converted to the corresponding bromhydrin as described in Example X(b). The crude product melts at 120–126° C. (with decomposition).

(c) *Production of 6α-fluoro-16α-methyl-9β,11β-oxido-Δ$^{1,4}$-pregnadiene-21-ol-3,20-dione-21-acetate*

10 g. of 6α-fluoro-9α-bromo-16α-methyl-Δ$^{1,4}$-pregnadiene-11β,21-diol-3,20-dione-21-acetate are converted into the corresponding 9,11β-epoxide as described in Example X(c). The crude product melts at 145–149° C. $\epsilon_{239}=14,300$.

(d) *Production of 6α,9α-difluoro-16α-methyl-Δ$^{1,4}$-pregnadiene-11β-diol-3,20-dione-21-acetate*

10 g. of 6α-fluoro-16α-methyl-9β,11β-oxido-Δ$^{1,4}$-pregnadiene-21-ol-3,20-dione-21-acetate are treated with hydrogen fluoride as described in Example X(d). The crude product is recrystallized from ethyl acetate. The melting point is 259/260–261.5° C. $\epsilon_{237}=16,400$.

EXAMPLE XII (METHOD 1)

(a) *Production of 6α-fluoro-16α-methyl-Δ⁴-pregnene-11α,21-diol-3,20-dione*

A fermenter made of stainless steel and having a 50 liter capacity is charged with 30 liters of a nutrient solution of:

| | Percent |
|---|---|
| Glucose (starch sugar) | 4.4 |
| Cornsteep liquor | 1 |
| NaNO₃ | 0.3 |
| KH₂PO₄ | 0.1 | and heated for one half hour at 120° C. for sterilization, and after cooling innoculated with a spore suspension of *Aspergillus ochraceus*, which is obtained by rinsing a 7-day corn cob culture (15 g. corn) with about 100 cc. of physiological sodium chloride solution.

After 1-day growth at 30° C. under stirring (220 revolutions per minute) and aeration (1.65 m³/hour), 1.8 liters of the obtained culture is removed under sterile conditions and transferred into a fermenter of the same size with 28.2 liters of a nutrient solution of 1% glucose and 1% soy flour. At the same time, 7.5 g. of 6α-fluoro-16α-methyl-Δ⁴-pregnene-21-ol-3,20-dione dissolved in 100 cc. of ethanol are added and fermented under the same conditions for about 48 hours.

The course of the fermentation is determined by removal of samples which are extracted with methyl isobutyl ketone. The extracts are analyzed by thin layer chromatography.

After the end of the fermentation the material is further worked up as described in Example I(a). The crude product can be recrystallized from ethyl acetate without chromatography. The melting point is 178.5–179.5° C. $\epsilon_{237}=14,800$.

(b) *Production of 6α-fluoro-16α-methyl-Δ⁴-pregnene-11α-21-diol-3,20-dione-21-acetate*

10 g. of 6α-fluoro-16α-methyl-Δ⁴-pregnene-11α,21-diol-3,20-dione are dissolved in 20 cc. of dimethyl formamide and under stirring mixed with 600 mg. of

$$Pb(CH_3COO)_2 \cdot 3.H_2O$$

and 8 cc. of acetanhydride. After subsequent stirring for an additional 2 hours at room temperature the reaction solution is poured into water. The resulting precipitate is filtered off under suction, dried and recrystallized from ethyl acetate-isopropyl ether. The melting point is 169.5–170° C. $\epsilon_{237}=14,900$.

(c) *Production of 6α-fluoro-16α-methyl-Δ$^{4,9(11)}$-pregnadiene-21-ol-3,20-dione-21-acetate*

4.22 g. of bromacetamide are added to a solution of 10 g. of 6α-fluoro-16α-methyl-Δ⁴-pregnene-11α-21-diol-3,20-dione-21-acetate in 100 cc. of pyridine at 20° C. and subsequently stirred for an additional 10 minutes. After cooling to +5° C., SO₂ gas is conducted into the solution at this temperature until, upon testing of the reaction mixture with potassium iodide starch paper a negative result is obtained. During the gas introduction a substance precipitates in the reaction mixture. It forms into a thick crystalline broth. To complete the precipitation, 200 cc. of water and −10° C. are added after completion of the gas introduction. The precipitate is filtered off under suction after several hours of standing washed with dilute pyridine-free hydrochloric acid and washed with water until neutral. The crude product is recrystallized from methylene chloride-ethyl acetate. The melting point is 160/165–168° C. $\epsilon_{234}=15,200$.

The further working up proceeds as decribed in Examples X(b)–X(e).

EXAMPLE XIII (METHOD 2)

(a) *Production of 6α-fluoro-16α-methyl-Δ$^{1,4}$-pregnadiene-11α,21-diol-3,20-dione*

7.5 g. of 6α-fluoro-16α-methyl-Δ⁴-pregnene-11α,21-diol-3,20-dione are fermented with *Bacillus lentus* as described in Example X(c). The crude product can be recrystallized without chromatography from ethyl acetate-isopropyl ether. The melting point is 255/257–260° C. $\epsilon_{237}=16,200$.

(b) *Production of 6α-fluoro-16α-methyl-Δ$^{1,4}$-pregnadiene-11α,21-diol-3,20-dione-21-acetate*

10 g. of 6α-fluoro-16α-methyl-Δ$^{1,4}$-pregnadiene-11α,21-diol-3,20-dione are selectively acetylated in 21-position as described in Example XII(b). The melting point is 230/233–235° C. $\epsilon_{237}=15,800$.

(c) *Production of 6α-fluoro-16α-methyl-Δ$^{1,4,9(11)}$-pregnatriene-21-ol-3,20-dione-21-acetate*

10 g. of 6α-fluoro-16α-methyl-Δ$^{1,4}$-pregnadiene-11α,21-diol-3,20-dione are dehydrogenated as described in Example XII(c). The melting point is 164–165° C. (from methanol). $\epsilon_{238}=16,750$.

The further working up proceeds as described in Example XI(c)–XI(d).

EXAMPLE XIV (a) *Production of 16α-methyl-6α-fluoro-9α-chloro-Δ$^{1,4}$-pregnadiene-11β,21-diol-3,20-dione-21-acetate*

1 g. of 16α-methyl-6α-fluoro-Δ$^{1,4,9(11)}$-pregnatriene-21-ol-3,20-dione-21-acetate (produced as described in Example XI(a)) are dissolved in 52.4 cc. of dioxane, mixed with 3.53 g. of N-chlorosuccinimide and 26.3 cc. of 1 n perchloric acid and stirred for 6 hours at 25° C. under argon. The solution is poured into ice water containing sodium thiosulfate, stirred for 1 hour and the precipitated substance is filtered off under suction, washed until neutral, dried and recrystallized from methanol/methylene chloride, the melting point is 252° C. (with decomposition). The yield is 0.79 g. UV. $\epsilon_{237}=16,100$.

(b) *Production of 16α-methyl-6α-fluoro-9α-chloro-Δ$^{1,4}$-pregnadiene-11β,21-diol-3,20-dione*

400 mg. of 16α-methyl-6α-fluoro-9α-chloro-Δ$^{1,4}$-pregnadiene-11β,21-diol-3,20-dione-21-acetate are suspended in 1.6 cc. of methylene chloride and 1.6 cc. of methanol and mixed at 0–5° C. under argon with a solution of 24 mg. of potassium hydroxide in 0.8 cc. of methanol. The reaction mixture is stirred for 80 minutes at 0–5° C., neutrialized with several drops of glacial acetic acid, diluted with methylene chloride, washed with water until neutral and evaporated. The residue is recrystallized from methanolmethylene chloride. The melting point is 254° C. (with decomposition). The yield is 265 mg. UV $\epsilon_{237}=16,200$.

EXAMPLE XV (a) *Production of 16α-methyl-9α-chloro-Δ$^{1,4}$-pregnadiene-11β,21-diol-3,20-dione-21-acetate*

11.6 g. of 16α-methyl-Δ$^{1,4}$-pregnadiene-11β,21-diol-3,20-dione-21-acetate are dissolved in 58 cc. of dimethyl formamide and 11 cc. of pyridine, mixed with 5.1 cc. of methane sulfochloride and stirred for 1 hour at 80° C. After cooling to 20° C., the solution is stirred into ice water, the precipitate filtered off under suction, dried and recrystallized from acetone/hexane. The obtained 16α-methyl-Δ$^{1,4,9(11)}$-pregnatriene-21-ol-3,20-dione-21 - acetate melts at 157–158° C. The yield amounts to 80% of the theoretical.

(b) *Production of 16α-methyl-9α-chloro-Δ$^{1,4}$-pregnadiene-11β-21-diol-3,20-dione-21-acetate*

3 g. of 16α-methyl-Δ$^{1,4,9(11)}$-pregnatriene-21-ol-3,20-dione-21-acetate are dissolved in 157 cc. of dioxane, mixed with 10.6 g. of N-chlorosuccinimide and 79 cc. of 1 n perchloric acid and stirred at 30° C. for 6 hours under argon. The solution is stirred into ice water containing sodium thiosulfate, the precipitate filtered off under suction, dried and recrystallized from isopropyl ether/methylene chloride. The obtained 16α-methyl-9α-chloro-Δ$^{1,4}$-pregnadiene-11β,21-diol-3,20-dione-21-acetate melts at 215° C. (with decomposition). The yield amounts to 65% of the theoretical. UV $\epsilon_{238}=15,500$.

(c) *Production of 16α-methyl-9α-chloro-Δ$^{1,4}$-pregnadiene-11β,21-diol-3,20-dione*

800 mg. of 16α-methyl-9α-chloro-Δ$^{1,4}$-pregnadiene-11β,21-diol-3,20-dione-21-acetate are saponified as described in Example X(b) and further worked up. The residue is recrystallized from methanol-methylene chloride. The melting point is 234° C. (with decomposition). The yield amounts to 60% of the theoretical. UV $\epsilon_{238}=15,300$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

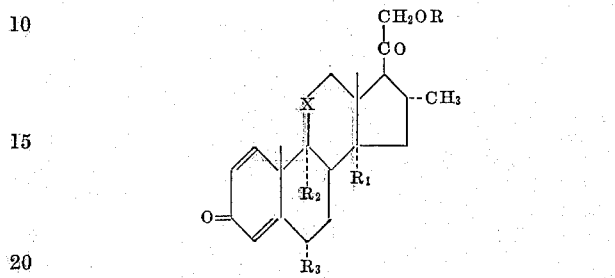

wherein R is selected from the group consisting of hydrogen and acyl wherein acyl is derived from a lower aliphatic carboxylic acid; wherein $R_1$ is selected from the group consisting of hydrogen and hydroxyl, $R_1$ being hydroxyl only when X is —$CH_2$—; wherein X is selected from the group consisting of —CO—, —CHOH— and —$CH_2$—; wherein $R_2$ is selected from the group consisting of hydrogen and halogen; and wherein $R_3$ is selected from the group consisting of halogen and methyl when $R_1$ is other than hydroxyl, and when $R_1$ is hydroxyl then $R_3$ is selected from the group consisting of hydrogen, methyl and halogen.

2. 16α-methyl-Δ$^{1,4}$-pregnadiene-14α,21-diol-3,20-dione.
3. 16α-methyl-Δ$^{1,4}$-pregnadiene-14α,21-diol-3,20-dione - 21-acetate.
4. 6α-chloro-16α-methyl-Δ$^{1,4}$-pregnadiene-11β,21 - diol-3,20-dione.
5. 6α-chloro-16α-methyl-Δ$^{1,4}$-pregnadiene-11β,21 - diol-3,20-dione-21-acetate.
6. 6α-fluoro-16α-methyl-Δ$^{1,4}$-pregnadiene-11β,21 - diol-3,20-dione.
7. 6α-fluoro-16α-methyl-Δ$^{1,4}$-pregnadiene-11β,21 - diol-3,20-dione-21-acetate.
8. 6α-fluoro-16α-methyl-Δ$^{1,4}$-pregnadiene-14α,21 - diol-3,20-dione.
9. 6α-fluoro-16α-methyl-Δ$^{1,4}$-pregnadiene-14α,21 - diol-3,20-dione-21-acetate.
10. 9α-fluoro-16α-methyl - Δ$^{1,4}$ - pregnadiene - 11β,21-diol-3,20-dione.
11. 9α - fluoro - 16α - methyl-Δ$^{1,4}$-pregnadiene-11β,21-diol-3,20-dione-21-acetate.
12. 6α,16α - dimethyl - Δ$^{1,4}$-pregnadiene-11β,21-diol-3,20-dione.
13. 6α,16α - dimethyl - Δ$^{1,4}$-pregnadiene-11β,21-diol-3,20-dione-21-acetate
14. 16α-methyl-6α,9α-difluoro-Δ$^{1,4}$ - pregnadiene - 11β,21-diol-3,20-dione.
15. 16α-methyl-6α,9α-difluoro-Δ$^{1,4}$ - pregnadiene - 11β,21-diol-21-acylate, wherein the acylate is derived from a lower aliphatic carboxylic acid.
16. 16α-methyl-6α,9α-difluoro-Δ$^{1,4}$ - pregnadiene - 11β,21-diol-21-acetate.
17. 16α-methyl-6α-fluoro-9α-chloro - Δ$^{1,4}$ - pregnadiene-11β,21-diol-3,20-dione.
18. 16α-methyl-6α-fluoro-9α-chloro - Δ$^{1,4}$ - pregnadiene-11β,21-diol-3,20-dione-21-acylate, wherein the acylate is derived from a lower aliphatic carboxylic acid.
19. 16α-methyl-6α-fluoro-9α-chloro - Δ$^{1,4}$ - pregnadiene-11β-21-diol-3,20-dione-21-acetate.
20. 16α-methyl-9α-chloro-Δ$^{1,4}$-pregnadiene-11β,21-diol-3,20-dione.
21. 16α-methyl-9α-chloro-Δ$^{1,4}$-pregnadiene-11β,21-diol-3,20-dione-21-acylate, wherein the acylate is derived from a lower aliphatic carboxylic acid.

22. 16α-methyl-9α-chloro-Δ$^{1,4}$-pregnadiene-11β,21-diol-3,20-dione-21-acetate.

23. The method of treating an external inflammatory condition, which comprises topically applying to a patient having such condition in the area of the inflammation a compound of the formula:

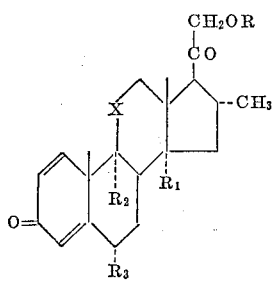

wherein R is selected from the group consisting of hydrogen and acyl wherein acyl is derived from a lower aliphatic carboxylic acid, wherein $R_1$ is selected from the group consisting of hydrogen and hydroxyl, $R_1$ being hydroxyl only when X is —$CH_2$—, wherein X is selected from the group consisting of —CO—, —CHOH— and —$CH_2$—, wherein $R_2$ is selected from the group consisting of hydrogen and halogen, and wherein $R_3$ is selected from the group consisting of halogen and methyl when $R_1$ is other than hydroxyl, and when $R_1$ is hydroxyl then $R_3$ is selected from the group consisting of hydrogen, methyl and halogen.

24. The method of treating an internal inflammatory condition, which comprises internally administering to a patient having such condition a compound of the formula:

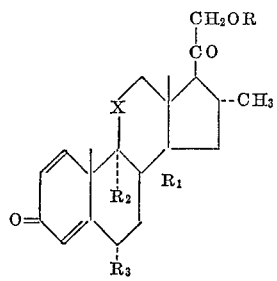

wherein R is selected from the group consisting of hydrogen and acyl wherein acyl is derived from a lower aliphatic carboxylic acid, wherein $R_1$ is selected from the group consisting of hydrogen and hydroxyl, $R_1$ being hydroxyl only when X is —$CH_2$—, wherein X is selected from the group consisting of —CO—, —CHOH— and —$CH_2$—, wherein $R_2$ is selected from the group consisting of hydrogen and halogen, and wherein $R_3$ is selected from the group consisting of halogen and methyl when $R_1$ is other than hydroxyl, and when $R_1$ is hydroxyl then $R_3$ is selected from the group consisting of hydrogen, methyl and halogen.

References Cited by the Examiner
UNITED STATES PATENTS
2,876,219   3/1959   Campbell et al. ___ 260—239.55

OTHER REFERENCES

Fieser et al.: Steroids, pages 692-96 (1959), Reinhold Pub. Co., N.Y.
Oliveto et al., J.A.C.S. 80, pp. 4428 and 31 (1958).
Taub et al., J.A.C.S. 80, p. 4435 (1958).
Taub et al., J.A.C.S. 82, pp. 4012-26 (1960).

LEWIS GOTTS, *Primary Examiner.*

Disclaimer 3,232,839.—*Klaus Kieslich, Ulrich Kerb,* and *Gerhard Raspe,* Berlin-Charlottenburg, Germany. $\Delta^{1,4}$-16a-METHYL STEROIDS. Patent dated Feb. 1, 1966. Disclaimer filed June 4, 1968, by the assignee, *Schering AG.*

Hereby enters this disclaimer to claims 10 and 11 of said patent.

[*Official Gazette November 19, 1968.*]